United States Patent [19]

Aneshansley

[11] 3,761,901

[45] Sept. 25, 1973

[54] NONVOLATILE MEMORY CELL

[75] Inventor: Nicholas E. Aneshansley, Centerville, Ohio

[73] Assignee: The National Cash Register Company, Dayton, Ohio

[22] Filed: June 28, 1972

[21] Appl. No.: 266,999

[52] U.S. Cl. ............... 340/173 R, 307/238, 307/279

[51] Int. Cl. ............................................ G11c 11/40

[58] Field of Search ................. 340/173 R; 307/238, 307/279

[56] References Cited

UNITED STATES PATENTS

| | | | |
|---|---|---|---|
| 3,508,211 | 4/1970 | Wegener | 340/173 R |
| 3,718,915 | 2/1973 | Lattin | 340/173 CA |

*Primary Examiner*—Terrell W. Fears
*Attorney*—J. T. Cavender et al.

[57] ABSTRACT

The present invention relates to a nonvolatile memory cell which includes a fixed threshold write transistor, a fixed threshold storage transistor and an alterable threshold read transistor therein. The gate electrode of the fixed threshold storage transistor is connected to a write or refresh select circuit through the write transistor. The drain electrode of the fixed threshold storage transistor is connected to a read data circuit through the read transistor. Read select, preset and store data circuits are connectable to the gate electrode of the alterable threshold read transistor to read volatile information out of the nonvolatile memory cell, or to nonvolatilely store information which is volatilely held within the nonvolatile memory cell, as power is removed from the nonvolatile memory cell.

13 Claims, 3 Drawing Figures

NONVOLATILE MEMORY CELL

BACKGROUND OF THE INVENTION

T. L. Palfi in U. S. Pat. No. 3,585,613 issued June 15, 1971, discloses a volatile memory cell which comprises a fixed threshold write transistor, a fixed threshold storage transistor and a fixed threshold read transistor. The information is volatilely stored in the volatile memory cell as a charge on the gate electrode of the fixed threshold storage transistor. If power is removed from the volatile memory transistor the charge stored on the gate electrode of the fixed threshold storage transistor soon leaks off. Thus, binary information which is volatilely stored in the volatile memory cell of the prior art is lost as power is removed therefrom.

In the nonvolatile memory cell of the present invention the read transistor has an alterable threshold voltage rather than a fixed threshold voltage. As power is removed from the nonvolatile memory cell of the present invention, binary information which is stored as a charged or uncharged gate electrode of the fixed threshold storage transistor is transferred to the alterable threshold read transistor as a first or second threshold voltage of said alterable threshold read transistor. The value of the threshold voltage of the alterable threshold read transistor is the required gate voltage on the gate electrode of the alterable threshold read transistor in order to make it conduct. The threshold voltage is said to have a first or second value although a continuum of threshold voltages are possible depending on the writing voltage and writing time used for an alterable threshold read transistor. Charge is thus transferred into the insulator layer of the alterable threshold read transistor from its substrate to decrease the amount of gate voltage which must be applied to the gate electrode of the alterable threshold read transistor to turn it on. For an optimum thickness of about 50 Angstroms for the silicon oxide layer of a metal-silicon nitride-silicon oxide-silicon (MNOS) alterable threshold read transistor, the charge will be held between its insulator layers for many months.

If a one bit is volatilely stored in the nonvolatile memory cell, as a charged gate electrode, the threshold voltage of the alterable threshold read transistor will be changed from −2 volts to −10 volts during loss of power. If a 0 bit is volatilely stored in the nonvolatile memory cell as an uncharged gate electrode, as power is removed therefrom, the threshold voltage of the alterable threshold read transistor remains at −2 volts. This nonvolatilely stored binary information will remain in the nonvolatile memory cell for several months without power being applied thereto. Once power is reapplied to the nonvolatile memory cell, the nonvolatilely stored binary information is transferred from the alterable threshold read transistor back to the fixed threshold storage transistor.

SUMMARY OF THE INVENTION

The present invention relates to a nonvolatile memory cell comprising a fixed threshold field effect write transistor having a source, drain and insulated gate electrode, a fixed threshold field effect storage transistor having a source, drain and insulated gate electrode, the source electrode of the fixed threshold field effect write transistor connected to the gate electrode of the fixed threshold field effect storage transistor, and an alterable threshold field effect read transistor having a source, drain and insulated gate electrode, the source electrode of the alterable threshold field effect read transistor connected to the drain electrode of the fixed threshold field effect storage transistor for reading binary information, which exists as either a charge or no charge on the gate electrode of the fixed threshold field effect storage transistor prior to power being removed from said nonvolatile memory cell, and for nonvolatilely holding the binary information of the fixed threshold field effect storage transistor as one of two threshold voltages of the alterable threshold field effect read transistor as power is removed from said nonvolatile memory cell.

An object of the present invention is to provide a nonvolatile memory cell for nonvolatilely holding a binary bit of information therein as power is removed therefrom.

Another object of the present invention is to provide an array of nonvolatile memory cells which will volatilely hold several binary bits of information therein as power is applied thereto and which will nonvolatilely hold said information therein as power is removed therefrom.

DESCRIPTION OF THE PREFERRED EMBODIMENT

Figure 1:
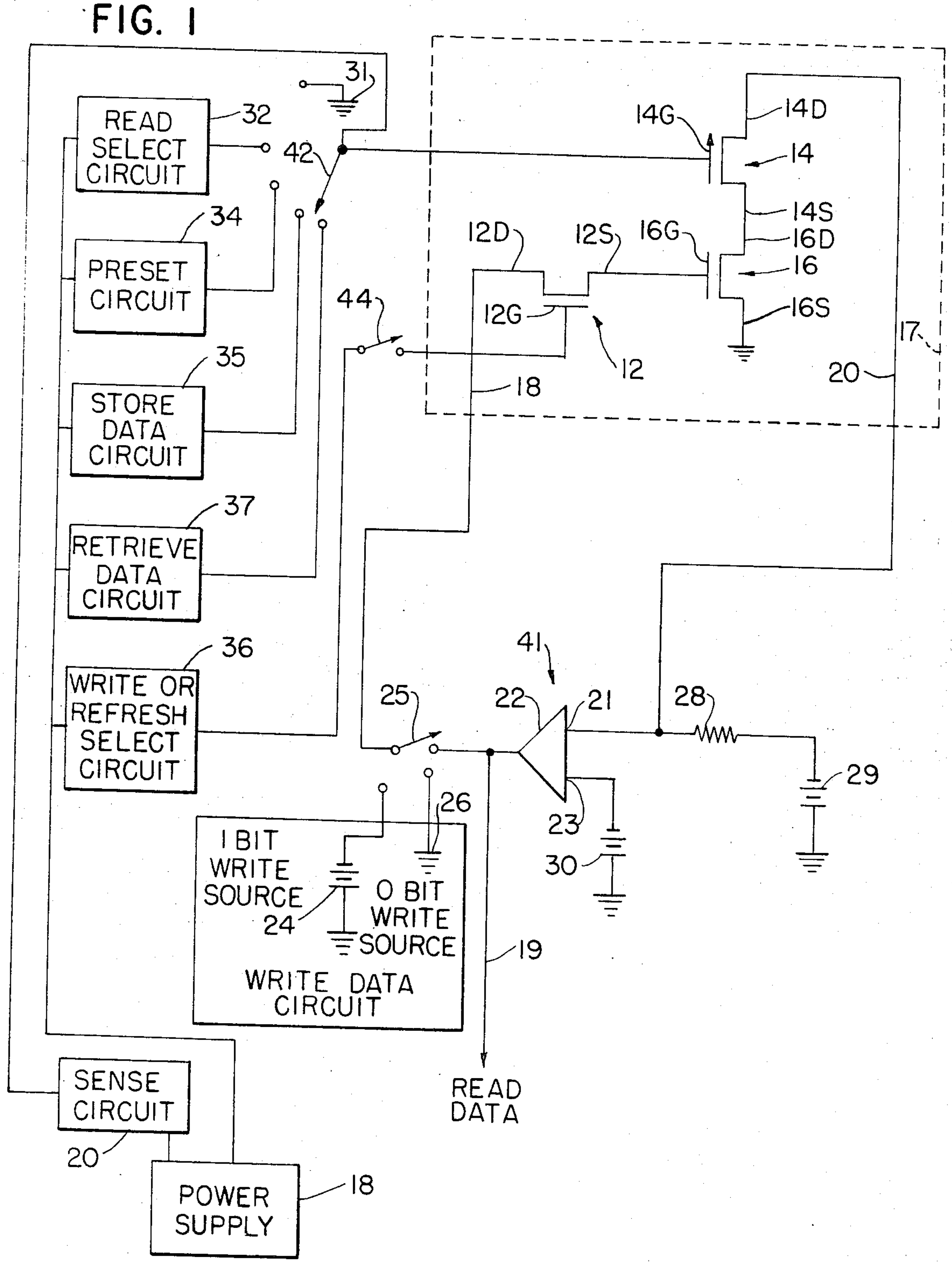
FIG. 1 is a schematic diagram of a nonvolatile memory cell of the present invention.

FIG. 1 shows the nonvolatile memory cell 17 of the present invention. The nonvolatile memory cell 17 has a fixed threshold write transistor 12, a fixed threshold storage transistor 16 and an alterable threshold read transistor 14 therein. The fixed threshold transistors 12 and 16 may be metal-oxide-semiconductor (MOS) field effect transistors. The alterable threshold read transistor 14 may be a metal-silicon nitride-silicon oxide-silicon (MNOS) field effect transistor. The source electrode 12S of the fixed threshold MOS write transistor 12 is connected to the gate electrode 16G of the fixed threshold MOS storage transistor 16. The source electrode 14S of the alterable threshold read transistor 14 is connected to the drain electrode 16D of the fixed threshold storage transistor 16. The fixed threshold write transistor 12 is used to either place a negative charge on the gate electrode 16G of the storage transistor 16 or to remove a negative charge from said gate electrode 16G. When charge is on the gate electrode 16G a one bit is said to be volatilely stored in the fixed threshold storage transistor 16. When no charge is on the gate electrode 16G, a zero bit is said to be volatilely stored in the fixed threshold storage transistor 16. When no charge is on the gate electrode 16G, the fixed threshold storage transistor 16 will allow shielding of the channel of the alterable threshold read transistor 14 during nonvolatile writing.

The channel region between the source and drain electrodes of MNOS alterable threshold transistor 14 is shielded by applying a −18 volt potential on the drain electrode 14D. When a −18 volt potential is placed on the gate electrode 14G, there will be no voltage differential across the silicon oxide-silicon nitride insulator layers of the MNOS alterable threshold transistor 14. The MNOS trnasistor has a preset threshold voltage of −2 volts. Electrons are trapped between the silicon oxide and silicon nitride insulator layers. Since no negative voltage exists on the gate electrode 14G with respect to the channel region of MNOS alterable threshold transistor 14, the electrons remain trapped. However if the channel region were not shielded, that is with no voltage being on drain electrode 14D, the trapped electrons would be driven into the channel region when a −18 volt potential is placed on gate electrode 14G. The thresold voltage of MNOS alterable threshold transistor 14 would then be changed from −2 volts to −10 volts. The channel shielding write technique is further described in U. S. Pat. No. 3,618,051 by Robert E. Oleksiak, issued Nov. 2, 1971.

A switch 42 is connected to the gate electrode 14G of the alterable threshold read transistor 14. The switch 42 can be connected to a read select circuit 32, which provides a −18 volt turn-on voltage to the alterable threshold read transistor 14. A −18 volt battery 29 is connected through load resistor 28 and lead 20 to the drain electrode 14D of the alterable threshold read transistor 14. An input 21 of a differential amplifier 22 is connected to the junction of lead 20 and load resistor 28. A reference voltage of −18 volts is supplied to input 23 of differential amplifier 22 by battery 30.

The alterable threshold read transistor 14 is used to determine whether or not a charge is volatilely stored on the gate electrode 16G of the storage transistor 16. If a charge is stored on the gate electrode 16G to hold fixed threshold storage transistor 16 in the conducting state, and switch 42 is connected to −18 volt read select circuit 32, a current can pass from battery 29 to ground through transistors 14 and 16. Input 21 of differential amplifier 22 will go to ground potential and an output voltage will appear on read data line 19, representing a volatile one bit. If no charge is volatilely stored on gate electrode 16G, input 21 will remain at −18 volts and no output voltage will appear on read data line 19, representing a volatile zero bit. By sensing for a voltage on read data line 19, one can determine the volatile state of nonvolatile memory cell 17.

When power is removed from the nonvolatile memory cell 17, a charge stored on the gate electrode 16G will leak off, but a one bit therein will not be lost since the one bit will be nonvolatilely stored in the alterable threshold MNOS read transistor 14. The nonvolatile storage is due to the channel shielding or not of the alterable threshold transistor 14 by the fixed threshold storage transistor 16. During the loss of power from power supply 18 to the nonvolatile memory cell 17, power supply sense circuit 20 causes switch 42 to be connected to a store data circuit 35. A −30 volt potential from store data circuit 35 is applied to the gate electrode 14G of the alterable threshold MNOS read transistor 14 for one millisecond. The store data circuit 35 has a source of power such as a −30 volt battery or a large −30 volt charged capacitor therein. Since a charge exists on the gate electrode 16G, the source electrode 14S is grounded because transistor 16 is caused to conduct due to the gate charge thereon. Thus the channel of the alterable threshold MNOS read transistor 14 is not shielded at this time and a full 30 volts is applied across the silicon nitride and silicon oxide insulator layers of the alterable threshold MNOS read transistor 14. Electrons stored at the interface between the silicon nitride and silicon oxide insulator layers are driven into the silicon substrate beneath the silicon oxide insulator layer. Thus the threshold voltage of the alterable threshold MNOS read transistor 14 is changed in about 1 millisecond from a preset −2 volts to −10 volts.

The store data circuit 35 has sufficient power storage to provide −30 volts for 1 millisecond. The threshold voltage of alterable threshold field effect read transistor 14 is preset to −2 volts before powerdown by preset circuit 34. The preset circuit 34 is a source of +30 volts which will persist for at least one microsecond.

If no charge is stored on the gate electrode 16G as power is lost from power supply 18, the source electrode 14S is not grounded but is placed at approximately the −18 volt level of the drain electrode 14D from battery 29, since storage transistor 16 is nonconductive. Then the channel region of the alterable threshold read transistor 14 is shielded, when a −30 volt potential is placed on the gate electrode 14G from store data circuit 35. Only a 12 volt differential is applied across the silicon nitride and silicon oxide insulator layers. This voltage differential is not sufficient to drive electrons from between the interface of the silicon nitride and silicon oxide insulator layers. Thus the threshold voltage of the alterable threshold MNOS read transistor 14 remains at a preset −2 volts.

When power is reapplied to the nonvolatile memory cell 17 of FIG. 1, the information nonvolatilely stored in the alterable threshold MNOS read transistor 14 is retreived and transferred back to the storage transistor 16. A charge is placed on gate electrode 16G by momentarily closing switch 44, which is connected to gate electrode 12G, and placing switch 25 to the one bit write source 24. A −8 volt potential is then applied to the gate electrode 14G from retrieve data circuit 37 through switch 42. The retrieve data circuit is a source of power which has a potential of −8 volts. If the threshold voltage of the alterable threshold read transistor 14 were at −2 volts, it would conduct. In the above case, however, since the threshold voltage of the alterable threshold MNOS read transistor 14 has been charged to −10 volts it will not conduct at a gate voltage of −8 volts. The charge on the gate electrode 16G will not be refreshed when switch 25 is connected to the differential amplifier 22 and switch 44 is again closed, since the voltages at inputs 21 and 23 of the amplifier 22 are both −18 volts. The charge on the gate electrode will soon leak off gate electrode 16G. The one bit nonvolatilely stored in the alterable threshold read transistor 14 is thus inverted, retrieved, and placed back into the nonvolatile memory cell 17 as a zero bit during this retrieval operation. This inversion can be cancelled by again going through a store and retrieve operation. During the second store and retrieve operation, the zero bit which was retrived into the fixed threshold storage transistor 16 is nonvolatilely written into the alterable threshold read transistor 14 as a zero bit and then this zero bit in the alterable threshold read transistor 14 is transferred as a one bit back into the fixed threshold storage transistor 16.

A differential amplifier circuit 41 is used to read and refresh information volatilely stored in the nonvolatile memory cell 17. If a −18 volt differential exists at inputs 21 and 23 of the differential amplifier 22, a −18 volt output is applied through switch 25 and over line 18 to drain electrode 12D. If the voltage at inputs 21 and 23 is equal, there is no voltage output from differential amplifier 22 to the drain electrode 12D. The battery 29 is connected through the dropping resistor 28 to the negative input 21 of the differential amplifier 22. A −18 volt reference voltage is applied to the negative input 23 of the differential amplifier 22 from battery 30. When alterable threshold read transistor 14 is made conductive from read select circuit 32, and fixed threshold storage transistor 16 is made conductive due to a charge on gate electrode 16G, line 20 is grounded and differential amplifier 22 passes a −18 volt output to line 18 when switch 25 is closed. When fixed threshold storage transistor 16 does not have a charge on its gate electrode 16G, but alterable threshold read transistor 14 is turned on, a zero voltage appears on the output of the differential amplifier 22. Thus if a charge exists on gate electrode 16G, it is refreshed by differential amplifier 22 when switches 25 and 44 are closed. Alternatively when no charge exists on gate electrode 16G, which is a zero bit, then this zero bit continues to exist as no charge on gate electrode 16G when switches 25 and 44 are closed. The one or zero bit may be read from line 19 just before a refresh operation. Thus line 19 may be used to sense whether a zero or a one bit is volatilely stored in the nonvolatile memory cell 17 of FIG. 1 prior to a refresh operation.

When new information is to be placed in nonvolatile memory cell 17, switch 25 is connected to either the one bit write source 24 or the zero bit write source 26. Switch 44 is closed to connect write or refresh select circuit 36 to gate electrode 12G. Write or refresh select circuit 36 is a source of power which has a potential of −18 volts. One bit write source 24 causes a −18 volt potential to be applied to the gate electrode 16G. The zero bit write source 26 applies no charge to the gate electrode 16G.

A ground terminal 31 is provided in order to ground gate electrode 14G after powerdown.

Figure 2:
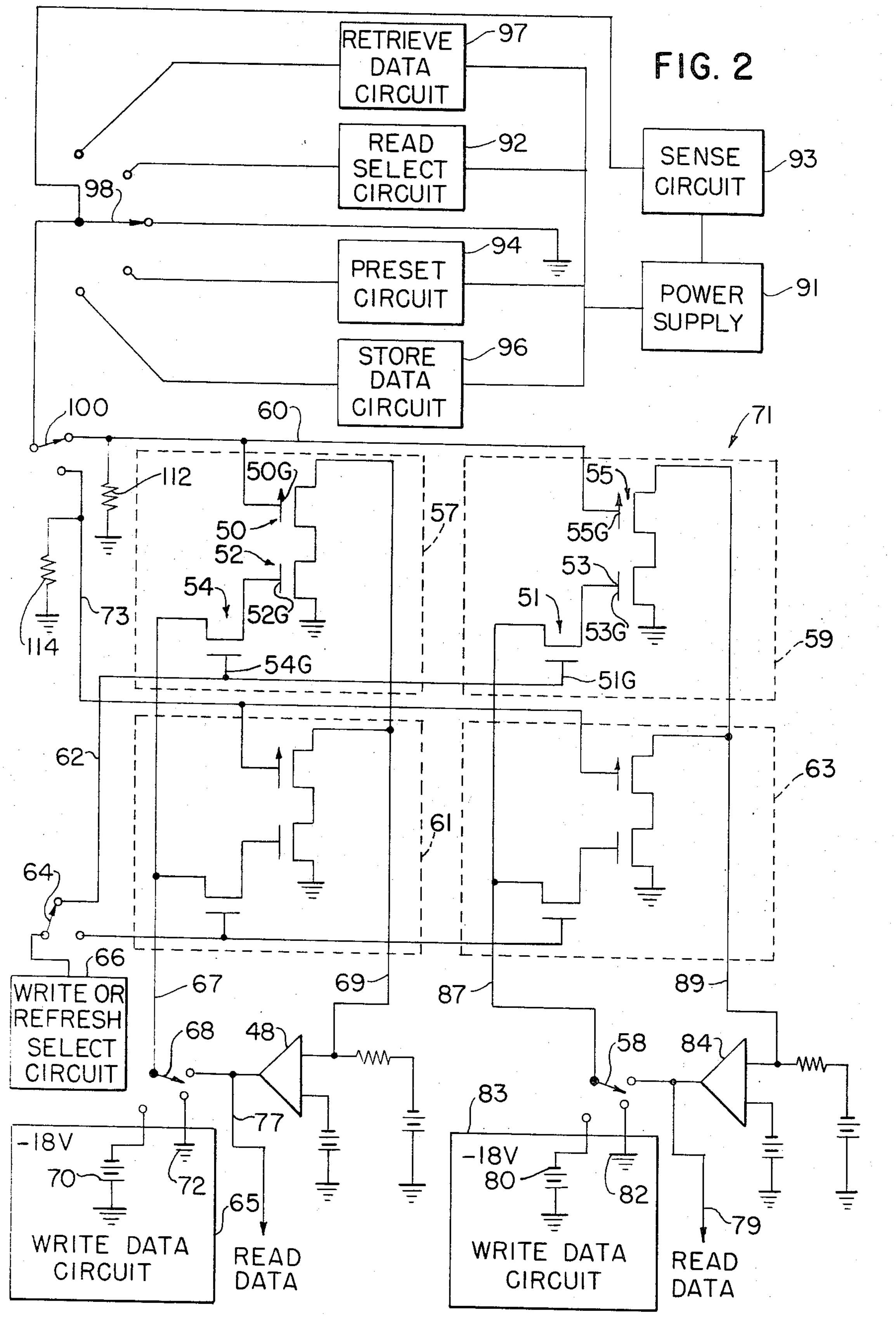
FIG. 2 is a schematic diagram of a 2 × 2 array of nonvolatile memory cells.

FIG. 2 shows an array 71 of four nonvolatile memory cells 57, 59, 61 and 63. The nonvolatile memory cells shown here are similar to the nonvolatile memory cell 17 of FIG. 1, and may be integrated into a silicon semiconductor wafer. The columns of nonvolatile memory cells 57, 61 and 69, 63 are connectable through switches 68 and 58 respectively to the differential amplifiers 48 and 84 which perform a "read and refresh" function or to one bit write sources 70 and 80 or to zero bit write sources 72 and 82. The gate electrodes 50G and 55G of the alterable threshold read transistors 50 and 55 of the nonvolatile memory cells 57 and 59, and corresponding gate electrodes in cells 61 and 63, are connectable through switches 98 and 100 to read select circuit 92 or retrieve data circuit 97. Resistors 112 and 114 are connected between lines 60 and 73 and ground to prevent either line from floating when the other is connected to switch 100. The gate electrodes 54G and 51G of the fixed threshold write transistors 54 and 51 of the row of nonvolatile memory cells 57 and 59, and corresponding gate electrodes in cells 61 and 63, are connectable through switch 64 to a write or refresh select circuit 66. By means of the write or refresh circuit 66, the read select circuit 92 and the write data circuit 65 or 83, a bit of information may be volatilely stored as a charge on the selected fixed threshold storage transistor in any of the four nonvolatile memory cells 57, 59, 61 or 63 of FIG. 2 in the same manner as previously described in connection with the embodiment of FIG. 1.

The information which is volatilely stored within the array 71 of nonvolatile memory cells of FIG. 2 may be nonvolatilely stored one row at a time by means of store data circuit 96. The switch 100 is used to select first the top row, and switch 98 is used to select store data circuit 96, to nonvolatilely store the volatile information contained in the top row of nonvolatile memory cells. The switch 100 is then used to select the bottom row and store data circuit 96 is used to nonvolatilely store the volatile information contained in the bottom row of nonvolatile memory cells.

Figure 3:
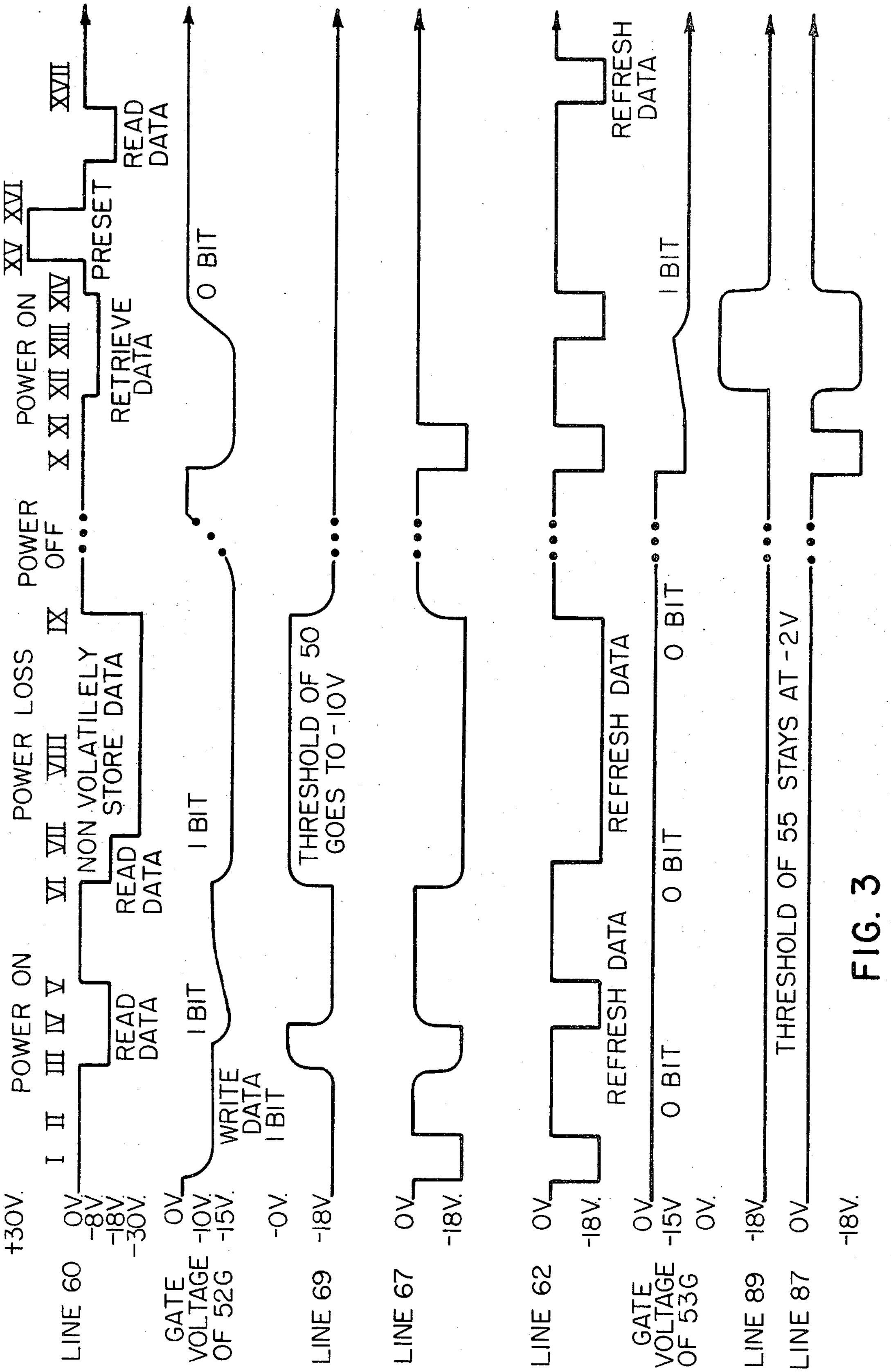
FIG. 3 is a timing diagram for two nonvolatile memory cells of the array of FIG. 2.

FIG. 3 shows wave forms for the read, refresh, preset, store and retrieve operations on the top row of the array 71 of FIG. 2. At time I a one bit is volatilely written into nonvolatile memory cell 57 as a charge on the gate electrode 52G of the fixed threshold storage transistor 52 via line 62 and line 67. The charge on the gate electrode 52G lowers the voltage of the gate electrode 52G to a voltage of −15 volts. The gate electrode 53G of the MOS storage transistor 53 of nonvolatile memory cell 59 remains at zero volts. At time II the voltage is removed from lines 62 and 67.

Between times III and V a read and refresh operation occurs. A −18 volt potential is placed on line 60 to turn on fixed threshold read transistors 50 and 55. Since charge exists on gate electrode 52G but not on gate electrode 53G, line 69 is grounded and line 89 is at −18 volts. Therefore a −18 volt one bit is read out of line 77 and a zero volt zero bit is read out of line 79.

The charge on gate electrode 52G is then refreshed at time IV by placing switches 68 and 58 in contact with differential amplifiers 48 and 84. Since no charge exists on gate electrode 53G, it remains uncharged by differential amplifier 84. Since a charge exists on gate electrode 52G, the charge on gate electrode 52G is refreshed by differential amplifier 48. At time V voltage is removed from lines 60 and 62.

At times VI to IX the one bit which is volatilely stored in the nonvolatile memory cell 57 is nonvolatilely stored therein during the loss of power from power supply 91 as sensed by sense circuit 93. At times VI and VII a read and refresh operation first occurs. At time VIII the zero bit volatilely stored in the nonvolatile memory cell 59 is nonvolatilely stored therein. This is accomplished by placing a −30 volt potential on line 60, with a −18 volt potential applied to line 62. The threshold voltage of the alterable threshold read transistor 50 is changed from −2 volts to −10 volts. The threshold voltage of alterable threshold read transistor 55 remains at −2 volts. At time IX the voltage is removed from lines 60 and 62 and power is completely removed from the array 71 of FIG. 2.

At time X power is reapplied to the array 71 of FIG. 2. At times X through XIV a data retrieve operation is performed. At time X, a −18 volt potential is applied to lines 67, 87 and 62. The gate electrodes 52G and 53G are thereby charged. At time XI, the −18 volt potential is removed from lines 62, 67 and 87. At time XII a −8 volt retrieve voltage is applied to line 60 from retrieve data circuit 97. Since threshold voltage of alterable threshold read transistor 50 is at −10 volts, it will not conduct at −8 volts gate voltage. However, since the voltage of alterable threshold read transistor 55 is at −2 volts, read transistor 55 will conduct at −8 volts gate voltage. A zero bit is then stored as no charge on gate electrode 52G and a one bit is stored as a charge on gate electrode 53G. Retrieval occurs between times XIII and XIV when line 62 is pulsed and switches 68 and 58 are connected to differential amplifiers 48 and 84. The data is retrieved in an inverted condition within nonvolatile memory cells 57 and 59 at time XIV. The voltage is then removed from lines 60 and 62 at time XIV. A second retrieve operation, similar to that occurring between times X and XIV, can be done between times XIV and XV to reinvert the inverted data retrieved and volatilely stored in nonvolatile memory cells 57 and 59.

Between times XV and XVI, the threshold voltages of the alterable threshold read transistors 50 and 55 are preset to −2 volts by preset circuit 94. This is done in anticipation of another power loss from power supply 91 to array 71 of FIG. 2. After time XVI normal write, read, and refresh operations, as shown between times I and V, may be performed on the array 71 of FIG. 2.

Although a nonvolatile memory cell of the present invention is connected and operated as described above, obvious variations may be carried out which would fall within the scope of the invention. These modifications will be evident, based on the description above.

What is claimed is:

1. A nonvolatile memory cell, comprising:

a. a fixed threshold field effect write transistor having a source, drain and insulated gate electrode;

b. a fixed threshold field effect storage transistor having a source, drain and insulated gate electrode, the source electrode of the fixed threshold field effect write transistor connected to the gate electrode of the fixed threshold field effect storage transistor; and c. an alterable threshold field effect read transistor having a source, drain and insulated gate electrode, the source electrode of the alterable threshold field effect read transistor connected to the drain electrode of the fixed threshold field effect storage transistor for reading binary information, which exists as either a charge or no charge on the gate electrode of the fixed threshold field effect storage transistor prior to power being removed from said nonvolatile memory cell, and for nonvolatilely holding the binary information of the fixed threshold field effect storage transistor as one of two threshold voltages of the alterable threshold field effect read transistor as power is removed from said nonvolatile memory cell.

2. The nonvolatile memory cell of claim 1 wherein the alterable threshold field effect read transistor is an alterable threshold MNOS field effect read transistor.

3. The nonvolatile memory cell of claim 1 wherein the fixed threshold field effect write transistor is a fixed threshold MOS field effect write transistor.

4. The nonvolatile memory cell of claim 1 wherein the fixed threshold field effect storage transistor is a fixed threshold MOS field effect storage transistor.

5. The nonvolatile memory cell of claim 1 wherein a store data circuit is connectable to the gate electrode of the alterable threshold field effect read transistor as power is removed from said nonvolatile memory cell for nonvolatilely storing volatile binary information of the fixed threshold field effect storage transistor into the alterable threshold field effect read transistor.

6. The nonvolatile memory cell of claim 1 wherein a preset circuit is connectable to the gate electrode of the alterable threshold field effect read transistor when power is applied to said nonvolatile memory cell for presetting the threshold voltage of the alterable threshold field effect read transistor to a selected level in anticipation of nonvolatilely storing binary information therein.

7. The nonvolatile memory cell of claim 1 wherein a retrieve data circuit is connectable to the gate electrode of the alterable threshold field effect read transistor when power is reapplied to said nonvolatile memory cell for applying a retrieve gate voltage to said gate electrode to allow retrieval of nonvolatilely stored binary information of the alterable threshold field effect transistor and the placing of said binary information into said fixed threshold field effect storage transistor.

8. The nonvolatile memory cell of claim 7 having a differential amplifier connectable to the drain electrode of the alterable threshold field effect storage transistor to sense if the alterable threshold field effect transistor is conductive at a selected retrieve gate voltage.

9. An array of nonvolatile memory cells of claim 1.

10. An array of nonvolatile memory cells of claim 1 integrated into a semiconductor wafer.

11. The array of nonvolatile memory cells of claim 9 wherein a store data circuit is connectable to the gate electrodes of the alterable threshold field effect read transistors as power is removed from said array for nonvolatilely storing the volatile binary information of the fixed threshold field effect storage transistors into the alterable threshold field effect read transistors connected thereto.

12. The array of nonvolatile memory cells of claim 9 wherein a preset circuit is connectable to the gate electrodes of the alterable threshold field effect read transistors when power is applied to said array for presetting the threshold voltage of the alterable threshold field effect read transistors to a selected level in anticipation of nonvolatilely storing binary information therein.

13. The array of nonvolatile memory cells of claim 9 wherein a retrieve data circuit is connectable to the gate electrodes of the alterable threshold field effect read transistors when power is reapplied to said nonvolatile memory cells for applying a retrieve gate voltage to said gate electrodes to allow retrieval of nonvolatilely stored binary information of the alterable threshold field effect transistors and the placing of said binary information into said fixed threshold field effect storage transistors.

* * * * *